(12) United States Patent
Wang

(10) Patent No.: US 7,679,845 B2
(45) Date of Patent: Mar. 16, 2010

(54) ADJUSTABLE/NON-ADJUSTABLE PRECISION OPTICAL MOUNTS

(75) Inventor: Xiwen Wang, Hacienda Heights, CA (US)

(73) Assignee: Newport Corporation, Irvine, CA (US)

( * ) Notice: Subject to any disclaimer, the term of this patent is extended or adjusted under 35 U.S.C. 154(b) by 134 days.

(21) Appl. No.: 11/627,307

(22) Filed: Jan. 25, 2007

(65) Prior Publication Data

US 2008/0180819 A1    Jul. 31, 2008

(51) Int. Cl.
| G02B 7/02 | (2006.01) |
| G03B 3/00 | (2006.01) |
| G01C 15/00 | (2006.01) |

(52) U.S. Cl. ............ 359/822; 359/198.1; 359/694; 359/429; 353/101; 33/286; 250/234

(58) Field of Classification Search ........... 359/819, 359/822, 848, 873, 877, 894, 694, 198.1, 359/429, 210.1, 220.1, 226.1; 250/216, 234–236, 250/339.05, 342; 244/3.16; 353/55, 100, 353/101; 396/144; 33/286; 343/753, 757; 348/143, 373

See application file for complete search history.

(56) References Cited

U.S. PATENT DOCUMENTS

| 3,897,139 A | * | 7/1975 | Caruolo et al. ............. 359/873 |
| 4,009,393 A | * | 2/1977 | Ashley et al. ............ 250/339.05 |
| 4,030,807 A | * | 6/1977 | Briney .................... 359/220.1 |
| 4,037,942 A |   | 7/1977 | Guyer |
| 4,039,246 A | * | 8/1977 | Voigt ..................... 359/220.1 |
| 4,436,260 A | * | 3/1984 | Donelan .................... 244/3.16 |
| 4,500,051 A | * | 2/1985 | Cottle et al. ............... 244/3.16 |
| 4,879,460 A | * | 11/1989 | Schleimann-Jensen et al. ... 250/234 |
| 4,929,073 A | * | 5/1990 | La Plante et al. ............ 359/848 |
| 5,007,175 A |   | 4/1991 | Schwarz |
| 5,754,327 A |   | 5/1998 | Masotti et al. |
| 5,757,561 A | * | 5/1998 | Sechrist et al. ............. 359/822 |
| 5,930,057 A | * | 7/1999 | Sechrist et al. ............. 359/822 |
| 6,008,924 A | * | 12/1999 | Ikegame .................. 359/198.1 |
| 6,304,393 B1 | * | 10/2001 | Sechrist et al. ............. 359/822 |
| 6,547,402 B2 | * | 4/2003 | Masuda ...................... 353/101 |
| 7,204,598 B2 | * | 4/2007 | Kuroda et al. ............... 353/101 |
| 7,520,063 B2 |   | 4/2009 | Zheng et al. |
| 2006/0042105 A1 |   | 3/2006 | McGrail et al. |
| 2006/0059699 A1 |   | 3/2006 | Krantz et al. |

* cited by examiner

*Primary Examiner*—Loha Ben
(74) *Attorney, Agent, or Firm*—Roeder & Broder LLP

(57) ABSTRACT

A highly precision, super stable, structure compact and fully lockable ball joint mechanism optical mounts are presented. Both stationary plate and movable plate have a partial-spherical hole or conical hole. Facing spacing aligns the bases of the partial-spherical holes or conical holes; a space adjustable cavity is formed. An external-spherical circumference shape optical element carrier plate fits and mates in the space adjustable combined cavity forms a ball joint mechanism, or an external-column circumference and edges chamfered optical element carrier plate fits and mates in the space adjustable combined internal-spherical shaped cavity forms an angle tilt-able and around axis swivel-able joint pair mechanism. A removable tooling for exporting a tilting and rotating movement to the optical element carrier plate are presented. Locking ring pushes the movable plate to adjust the combined cavity and locking the optical element carrier plate and to lock optical element that is carried thereby.

21 Claims, 15 Drawing Sheets

ADJUSTABLE/NON-ADJUSTABLE PRECISION OPTICAL MOUNTS

BACKGROUND OF THE INVENTION

1. Field of the Invention

This invention relates generally to a precision optical mount. It is adjustable with a removable tool set and non-adjustable as removing the tool set. It is a precision adjustable (both tilt-able for angle adjustment and around axis rotate-able), highly compact and solid lockable optical mount that reliably carries an optical element (e.g. a mirror, prism, lens, wave-plate, filter and the like). So that a plurality of such optical mount can be arranged into a compact and optical efficient system wherein the stability is strengthened. The space consumption is minimized. Non-distortion is introduced.

2. Description of Related Arts

Referring to FIG. 2 of the drawings, adjustable/non-adjustable precision optical mount 100 is disclosed which include a generally stationary plate 200, an external-spherical round shaped optical element carrier plate 300, (aka An optical element carrier plate 300 having an external spherical shaped surface along its circumference 326), a generally movable plate 400, and a locking ring 500. The optical element carrier plate 300, fitting in and mating with in the space adjustable combined internal-spherical shaped cavity that is formed by the stationary plate 200 and the movable plate 400 forms a ball joint mechanism. The external-spherical round shaped optical element carrier plate 300 can be tilted for angle adjustment and rotated for rotation adjustment. The locking ring 500 can push the movable plate 400 to adjust the space adjustable combined internal-spherical shaped cavity to lock the external-spherical round shaped optical element carrier plate 300 and therefore to firmly lock the optical element that is carried thereby.

Referring to FIG. 1 of the drawings, conventional optical mounts 001 are known, which include a generally solid, rectangular backup support plate 010 and a rectangular faceplate 014. The backup plate 010 and faceplate 014 are coupled in facing spacing alignment with one to another. A series springs 016, ball 012 and screws 020 maintains space and couple alignment of the backup plate 010 and faceplate 014. The faceplate 014 carries an optical element 026 (e.g. a mirror) and is adapted to be moved by means of rotate-able knobs 028 having threaded shafts 018 that extend through the backup plate 010 to be advanced into contact with faceplate 014 and thereby impart an angle tilting or translational movement to the faceplate 014 so that the position of the optical element 026 may be correspondingly changed relative to an incident beam of optical energy.

Conventional optical element mounts, such as those typically associated with optical components are generally not suitable to position optical elements utilized in like Laser applications. Typically, conventional adjustable optical element mounts are suspended from a base support structure by a system of screw jacks and springs.

Conventional optical mounts, an optical element are normally affixed to a plate that is suspended from and movable with respect to a backup support plate firmly mounted to an optical bench. If the optical mount setup in a laser system, since laser beams are generally directed to substantially horizontally, the optical element surface are typically perpendicular to gravitational forces. Thus, the optical elements are cantilevered from the surface of a support backup plate and must rigidly support a relatively heavy weight suspended wherefrom.

Conventional optical mounts for adjustment with tilting and rotating is separately operated by different mechanism. Combining the two mechanisms together can operate both tilting and rotating adjustment; the complicate mechanism occupies more space and lowers the reliability.

A series of springs in conventional mounts between the ridged support plate and the moveable plate from which the optical element (e.g. a mirror) is mounted provides a force that maintains one or more optical elements actuators and compression or tension, thereby stabilizing the optical element. However, conventional type spiral springs have little or no resistance to shear forces, which are large and heavy optical elements cantilevered from the rigid mount. Therefore, pins or ball type sockets are generally required to support the moveable plate. These supporting devices introduce frictional hysteresis that inherently reduces the required position accuracy of the optical elements.

Further, where screw type actuation is manually or mechanically manipulated to position the optical elements, some type of locking mechanism is required. During activation of the locking mechanism positioning errors may be introduced. For example, the simple procedure of tightening a setscrew to lock an optical element usually requires much tedious and time-consuming trial and error to align one or more mirrors to a desired setting.

Additionally, for example a laser, the efficiency of a laser is critically dependent on the angular alignment of the optical components defining the laser resonator. Mechanical vibrations and ambient temperature changes unavoidably transmitted to the optical mount assemblies jeopardize the mirror alignment of a field laser system.

There is a need for an optical element mount assembly that provides precision alignment and adjustment of an optical element. Further, there is a need for an optical element mount assembly where vibration, shock and changes in temperature minimally affect the alignment of the optical elements. It would be desirable to provide an optical element mount assembly which the adjustment as a function mechanism that is removable as the optical element mount is adjusted, and the optical elements mount totally is finally set to reduce the affect from vibration, shock and temperature change and to reduce mechanical hysteresis applied to any threaded screws.

SUMMARY OF THE INVENTION

It is therefore an object of the present invention to provide an optical mount assembly, which can eliminate the aforesaid disadvantages of known designs, and other problems found within the prior art, for a wide variety of optical device.

Another object of the present invention is to provide an optical mount assembly, which the optical element can be angle adjusted or say tilted in any direction and rotated around the axis with specific tooling.

According to a first embodiment of the invention, a precision optical mount is disclosed having a generally stationary plate with a partial-spherical shaped hole, a generally movable plate with a partial-spherical shaped hole, an external-spherical round shaped optical element carrier plate and a locking ring. By means of a pair of guiding mechanisms, the partial-spherical hole of the stationary plate is coupled in spacing facing relationship and co-axis adjustment with the partial-spherical hole of the movable plate forms a space adjustable combined internal-spherical shaped cavity. The external-spherical round shaped optical element carrier plate mates with and fits in the space adjustable combined internal-spherical shaped cavity to form a ball joint mechanism. The locking ring screw-heads in the threaded hole of the stationary plate to push and move the movable plate. Thus the space adjustable combined internal-spherical shaped cavity is adjusted and the external-spherical round shaped optical element carrier plate is locked and therefore the optical element that has been carried thereby is locked.

According to a second embodiment of the invention, a precision optical mount is disclosed having a generally stationary plate with a conical shaped hole, a generally movable plate with a conical shaped hole, an external-spherical round shaped optical element carrier plate and a locking ring. By means of a pair of guiding mechanism, the conical shaped hole of stationary plate is coupled in spacing and facing relationship, and co-axis alignment with the conical shaped hole of the movable plate forms a space adjustable combined internal-conical cavity. The external-spherical round shaped optical element carrier plate mates with and fits in the space adjustable combined internal-conical cavity form a ball joint mechanism. The locking ring screw-threads in the thread hole of the Stationary plate to push and move the movable plate. Thus the space adjustable combined internal-conical cavity is adjusted and the external-spherical round shaped optical element carrier plate is locked and therefore the optical element that has been carried thereby is locked.

According to a third embodiment of the invention, a precision optical mount is disclosed having a generally stationary plate with a partial-spherical shaped hole, a generally movable plate with a partial-spherical shaped hole, and chamfered edge cylinder shaped optical element carrier plate (aka an external-round column circumference and chamfered edges optical element carrier plate and a locking ring). By means of a pair of guiding mechanism, the partial-spherical hole of stationary plate is coupled in spacing, facing relationship, and co-axis alignment, with the partial-spherical hole of the movable plate to form a space adjustable combined internal-spherical shaped cavity. An external-round column circumference and chamfered edges optical element carrier plate mates and fits in the space adjustable combined internal-spherical shaped cavity that forms an angle tilt-able and around the axis rotate-able joint pair mechanism. The locking ring screw-threads in the thread hole of the stationary plate to push and move the movable plate. Thus, the space adjustable combined internal-spherical shaped cavity is adjusted and the external-round column circumference and chamfered edges optical element carrier plate are locked and therefore the optical element that has been carried thereby is locked.

Advantages of these optical mounts according to the present invention include the aspect that an external-spherical round shaped optical element carrier plate, which is constituted by a precision-machined external-spherical shape and relative optical element carrier interface adapt, or external-round column circumference and chamfered edges optical element carrier plate, which is constituted by precision-machined external-round column circumference and chamfered edges and relative optical element carrier interface adapt, and the aspect that a space adjustable combined internal-spherical shaped cavity is formed by a movable plate, which is constituted by a precision machined partial-spherical shaped hole, and a stationary plate, which is constituted by a precision machined partial-spherical shaped hole, or a space adjustable combined internal-conical shaped cavity which is formed by a movable plate, which is constituted by a precision machined conical shaped hole, and a stationary plate, which is constituted by a precision machined conical shaped hole. It is necessary that any spring and/or ball for suspension are superfluous for a highly accurately position, highly precision, high stability and highly reproducibility optical mount. A specially designed angle adjustable (or say tilt-able) and rotation around axis implement mechanism can be attached onto and removed from the optical element mount, so any threaded screws and springs for adjustment are not needed.

Another advantage of the present invention is the gravity center of optical element is overlap or close to the support centre to eliminate cantilever structure that the weight, vibration and shock will cause torsion and cause instability. Another advantage of the present invention is locking mechanism, which will keep the optical element in an accurate position and not affected by shock, vibration and temperature change. Also this locking will not cause any stress on optical element. Another advantage of the present invention has a very simple assembly structure for operating and maintenances.

BRIEF DESCRIPTION OF THE DRAWINGS

The invention will now be described with reference to the figures.

DETAILED DESCRIPTION

Figure 1:
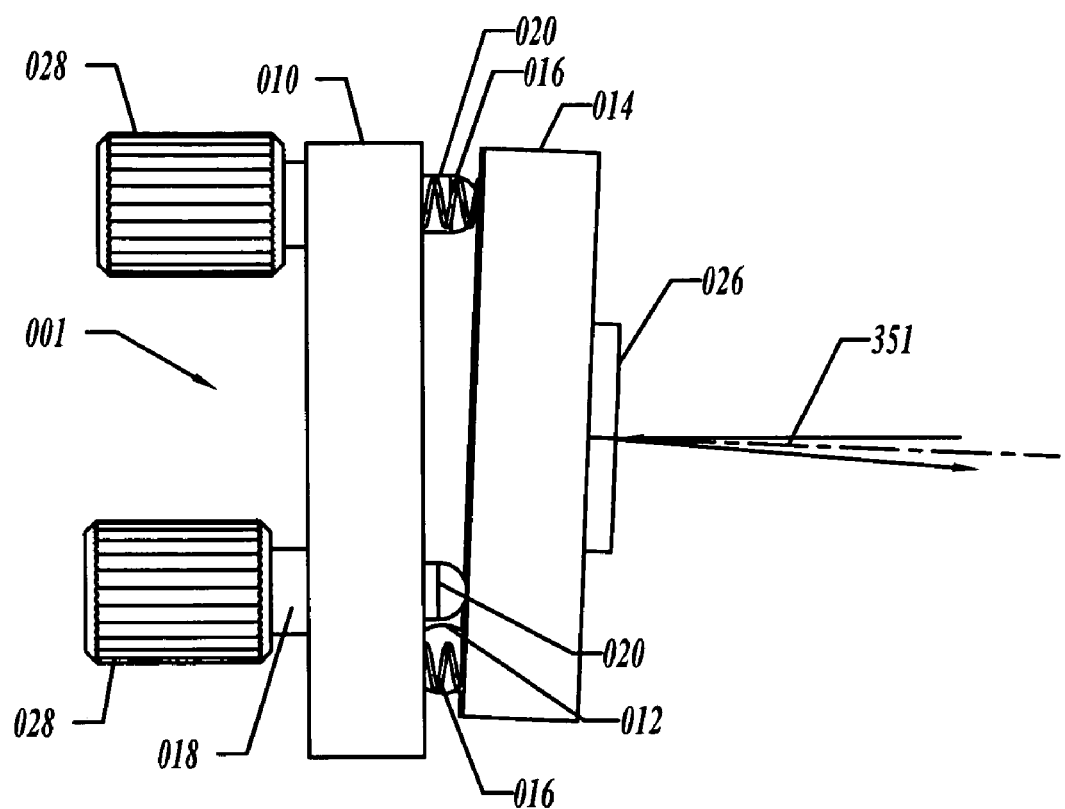
FIG. 1 is a partial diagram of an optical system in which an optical mount according to the present invention is arranged to reflect a beam of optical energy.
Figure 2:
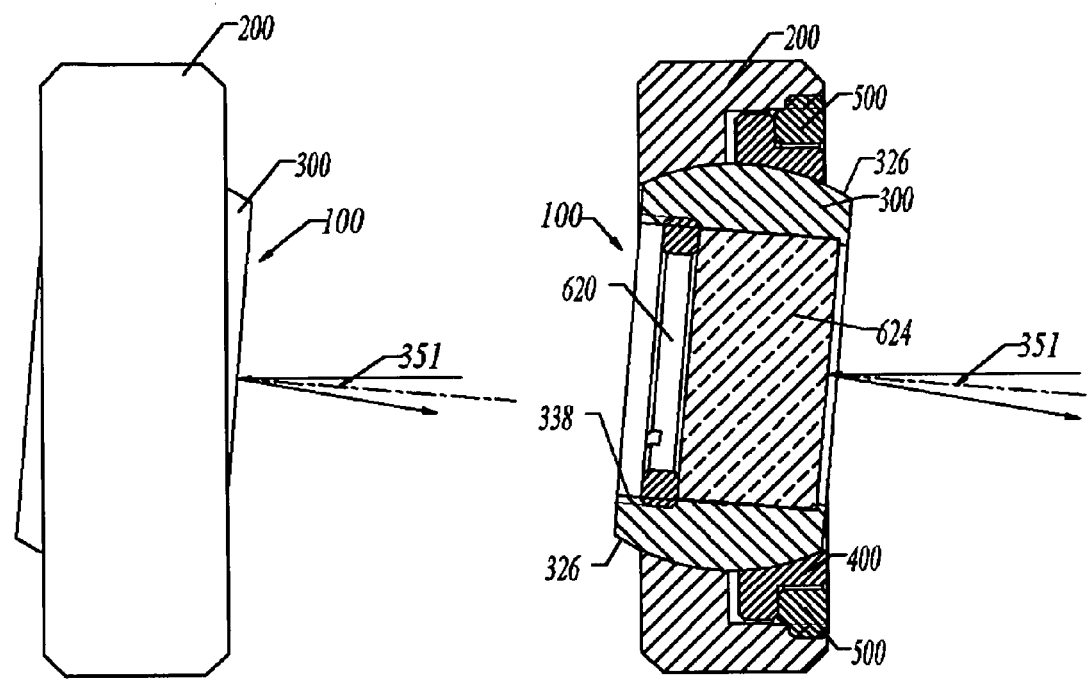
FIG. 2 is a partial diagram of an optical system in which a conventional optical mount are arranged to reflect a beam of optical energy.
Figure 3A:
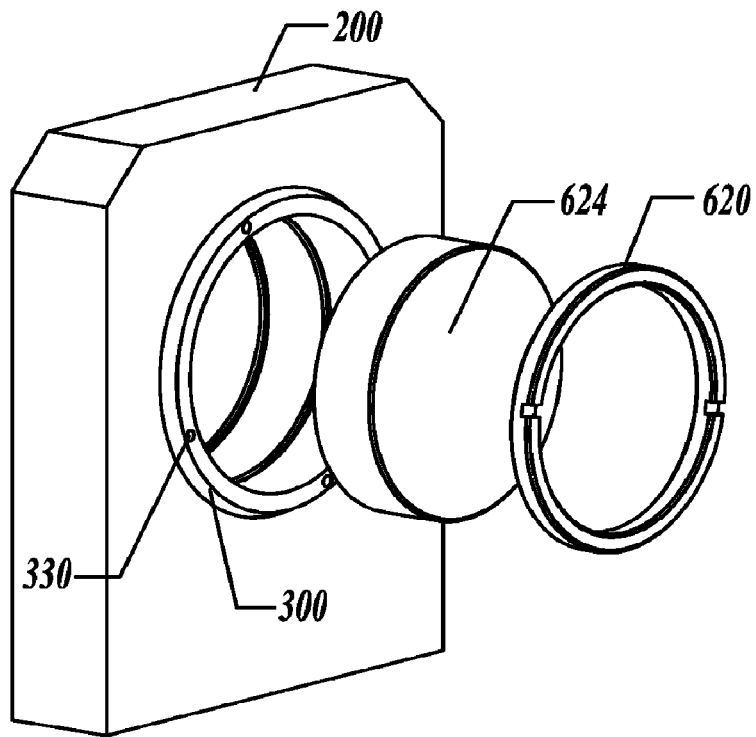
FIGS. 3A and 3B are perspective views of the adjustable/non-adjustable precision optical mount according to a first embodiment of this invention.
Figure 3B:
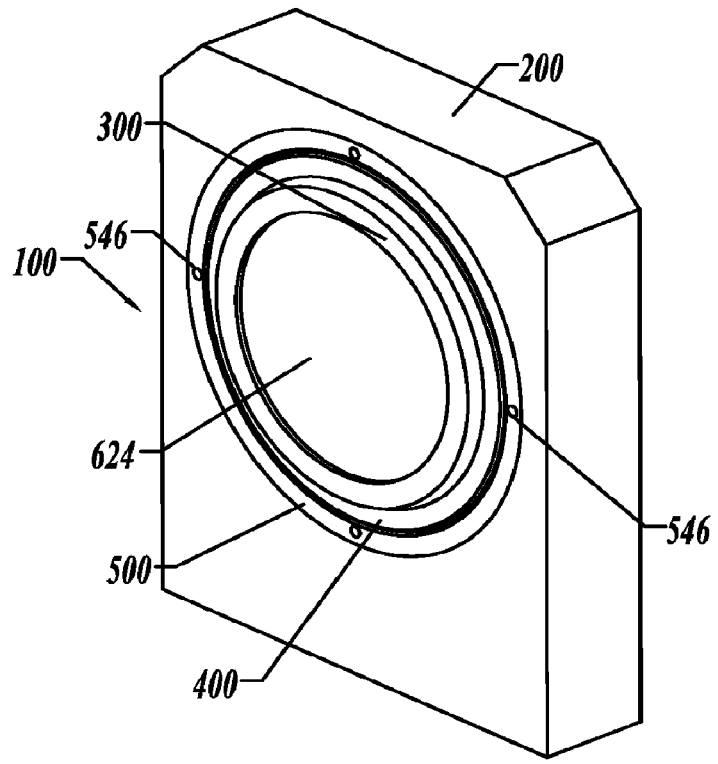
Figure 4:
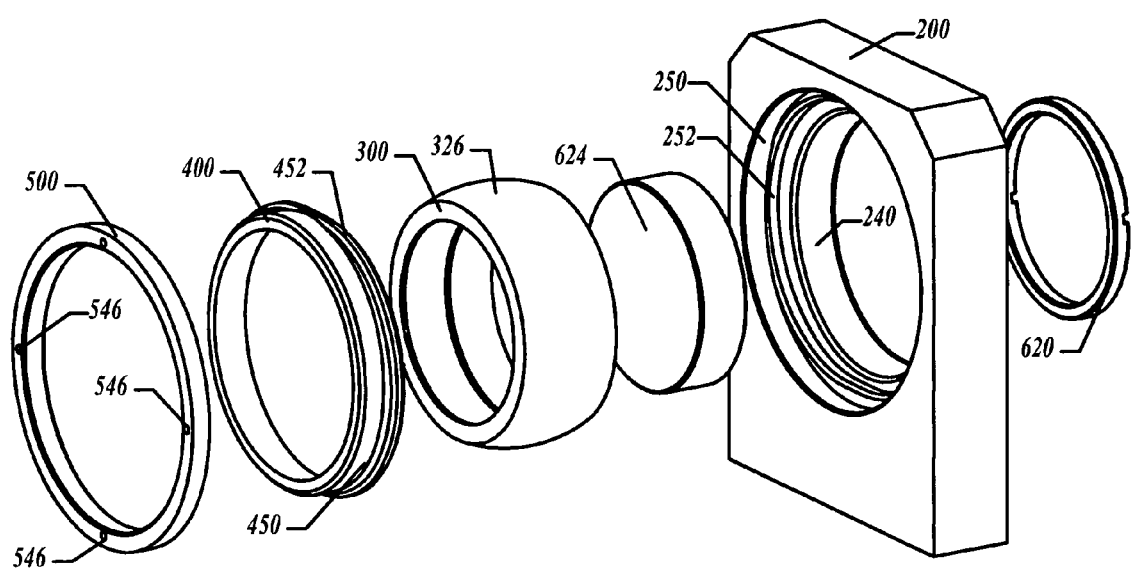
FIG. 4 is an "exploded" view of the Adjustable/non-adjustable Precision Optical Mounts of FIG. 3.

The Adjustable/Non-adjustable Precision Optical Mounts 100 according to a first embodiment of the present invention is disclosed while referring concurrently to FIG. 2-7 and FIG. 11 of the drawings. The optical mount 100 has a stationary plate 200, a movable plate 400, an optical element carrier plate 300 and a locking ring 500.

As an important detail of the optical mount 100, the stationary plate has a partial-spherical shaped hole 240 (Best shown in FIGS. 6 & 7) that receives the optical element carrier plate 300.

Figure 6:
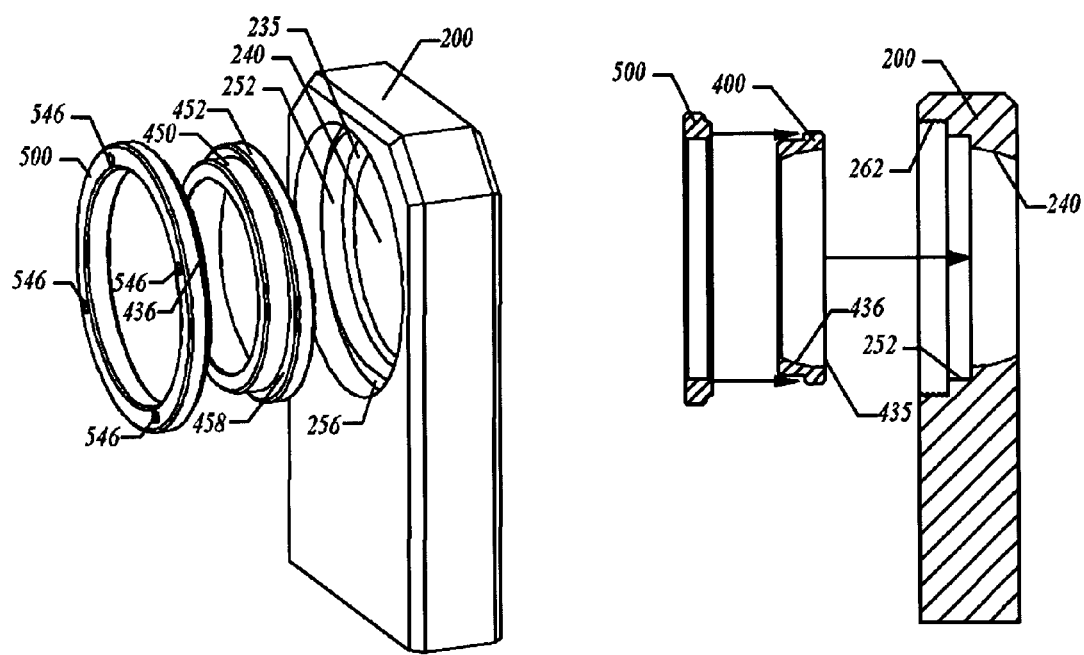
FIG. 6 is a perspective view of a space adjustable combined internal-spherical shaped cavity formed by a stationary plate and a movable plate.
Figure 7:
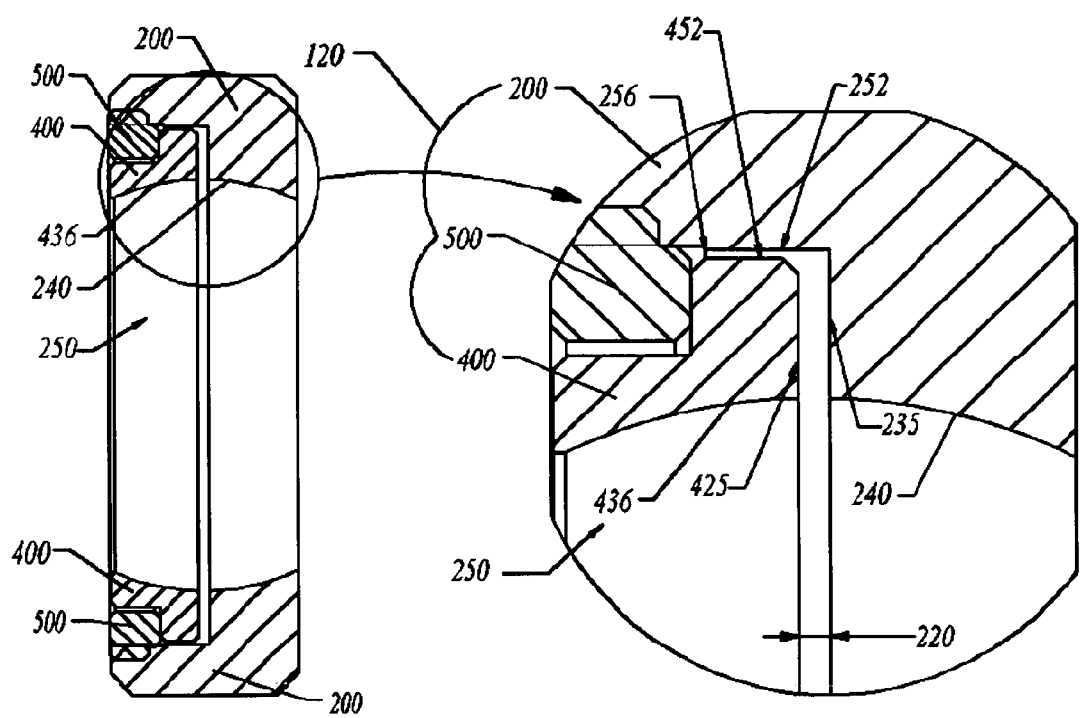
FIG. 7 is a section view of a space adjustable combined internal-spherical shaped cavity.

As another important detail of the optical mount 100, the movable plate 400 has a partial-spherical shaped hole 436 (Best shown in FIGS. 6 & 7).

Except for a partial-spherical shaped hole 240, the stationary plate has a non-circle step hole 252 as a guiding mechanism, to receive the movable plate 400, a thread hole 262 as a locking ring guiding mechanism to receive the locking ring 500 and a step mechanism for position limit. It should be noted that the partial-spherical shaped hole 240, the non-circle step hole 252, and the threaded hole 262 can also be referred to as a first portion, a second portion, and a third portion of the stationary plate 200.

For the movable plate 400, except for the partial-spherical shaped hole 436, the movable plate has an external non-circle as a guiding mechanism 452 (Best shown in FIG. 6).

Figure 11:
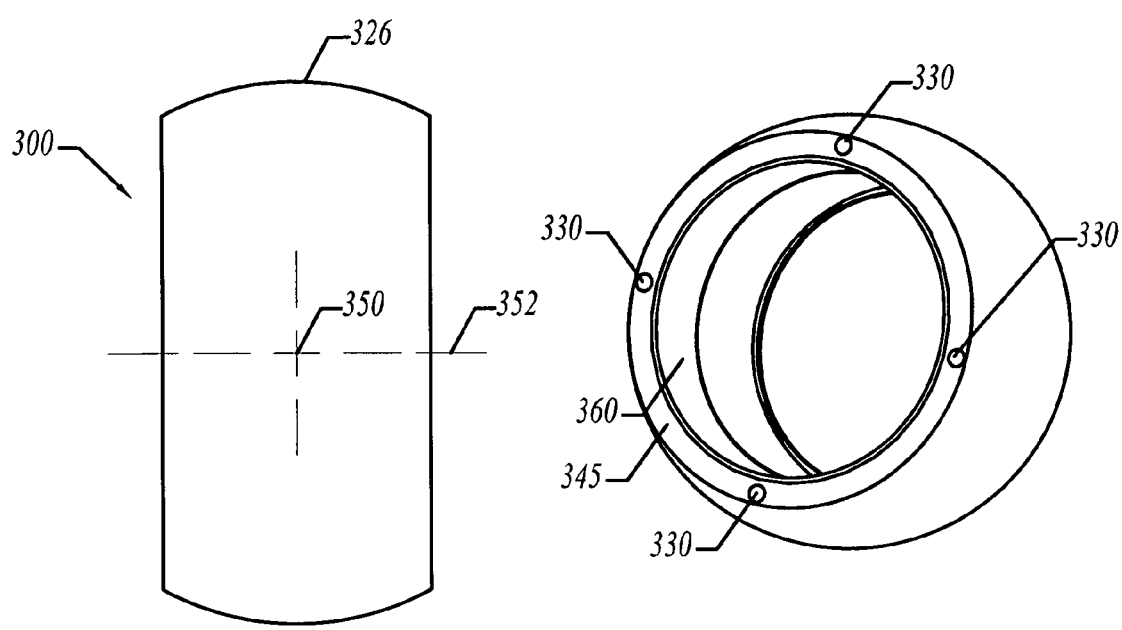
FIG. 11 is a perspective view of an optical element carrier plate with an external-spherical round shaped circumference.

FIG. 11 shows the optical element carrier plate 300, which is formed with an external-spherical shape 326 and an optical element carry interface 320, 340 in the center. Also in the back-end 345 of the optical element carrier plate 300 has straight mating holes 330 as an interface mechanism for adjustment implement 700 (FIG. 15) or 800 (FIG. 16).

For description accuracy, suppose the larger side 235 of the partial-spherical shaped hole 240 (FIGS. 4 and 7) of stationary plate 200 and the large side 425 of the partial-spherical shaped hole 436 of movable plate 400 are the bases of the partial-spherical shaped holes.

FIG. 7 shows a space adjustable combined internal-spherical cavity 250. Spacing facing co-axis alignment the base 235 of partial-spherical shaped hole 240 of stationary plate 200 and the base 425 of partial-spherical shaped hole 436 of movable plate 400 with one to another forms this space adjustable combined internal-spherical cavity 250. To keep the alignment, the external non-circle guiding mechanism 452 of movable plate 400 mates and fits in the non-circle step hole guiding mechanism 252 of stationary plate 200 and forms a piston mechanism 120. The movable plate 400 can only straightly move forward and draw back along the non-circle step hole 252 without any rotation.

Figure 5:
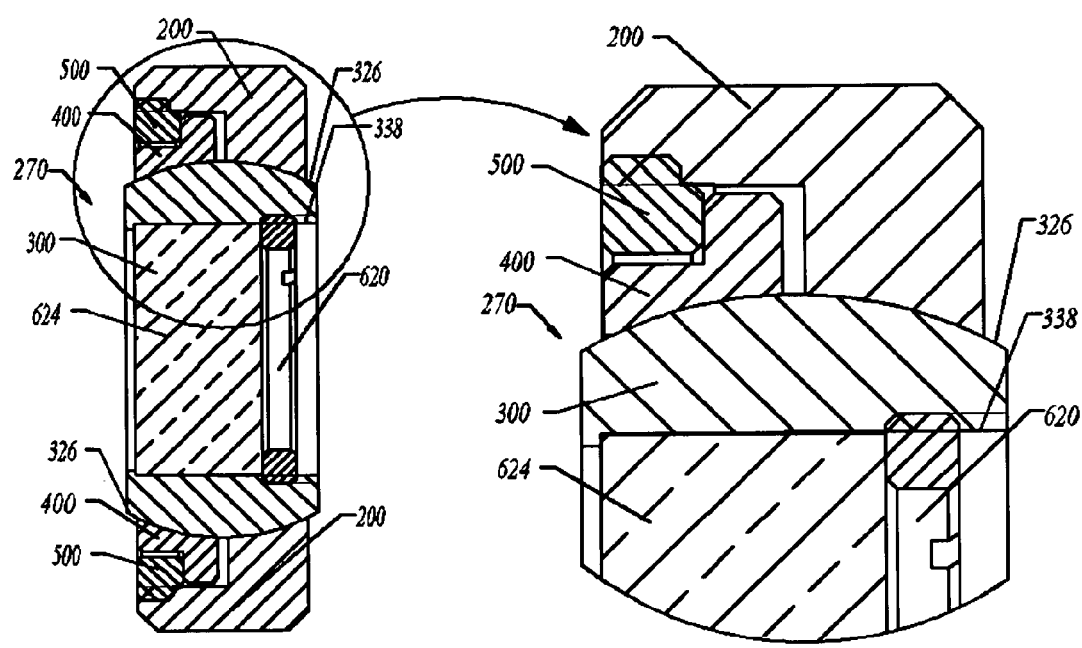
FIG. 5 is a cross section view of the Adjustable/non-adjustable Precision Optical Mounts of FIG. 3. An external-spherical round shaped optical element carrier plate fits in a space adjustable combined internal-spherical shaped cavity.

FIG. 5 shows that the external-spherical round shaped optical element carrier plate 300 mates with and fits in the space adjustable combined internal-spherical cavity 250 to form a ball joint mechanism 270, so the center 350 of the external-spherical round shaped optical element carrier plate 300 is overlapping or close to the center 260 of the space adjustable combined spherical cavity 250. The external-spherical round shaped optical element carrier plate 300 can be tilted for angle adjustment around the center 350 (FIG. 11) and the optical element 624 that is carried thereby is tilted for angle adjustment. Around the axis 352 of the external-spherical round shaped optical element carrier plate 300 can be rotated and the optical element 624 carried thereby is rotated for adjustment.

The Adjustable/Non-Adjustable Precision Optical Mounts 101 according to a second embodiment of the present invention is disclosed while referring concurrently to FIG. 8-11 of the drawings. The optical mount 101, has a stationary plate 201, a movable plate 401, an external-spherical round shaped optical element carrier plate 300 and a locking ring 500.

Figure 9:
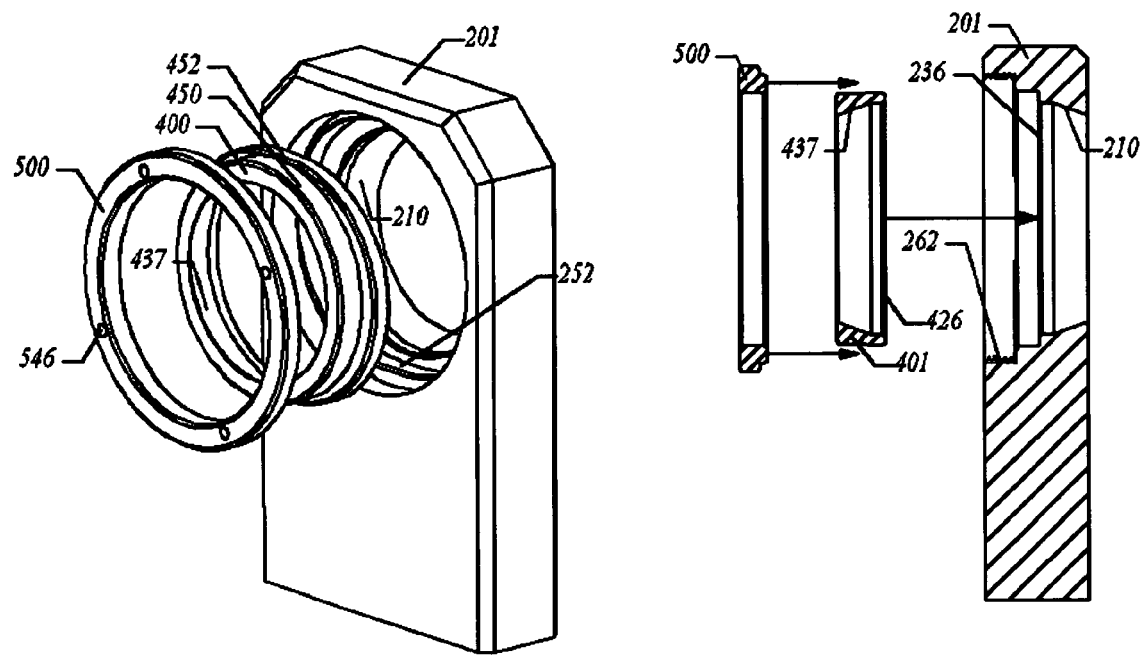
FIG. 9 is an exploded perspective view of a space adjustable combined internal-conical shaped formed by a stationary plate and a movable plate.

As an important detail of the optical mount 101, the stationary plate has a conical shaped hole 210 (Best shown in FIG. 9).

As another important detail of the optical mount 101, the movable plate 401 has a conical shaped hole 437 (Best shown in FIG. 9).

Except for a conical shaped hole 210 of the stationary plate 201, the stationary plate 201 has a non-circle step hole 252 as a guiding mechanism, a thread hole 262 as locking ring guiding mechanism and a step mechanism 256 for position limit.

For the movable plate 401, except for the conical shaped hole 437, the movable plate has an external non-circle guiding mechanism 452 (Best shown in FIG. 9).

For description accurately, suppose the larger side 236 of the conical shaped hole of stationary plate 201 and the large side 426 of conical shaped hole of movable plate 401 are the bases of the conical shaped holes.

Figure 10:
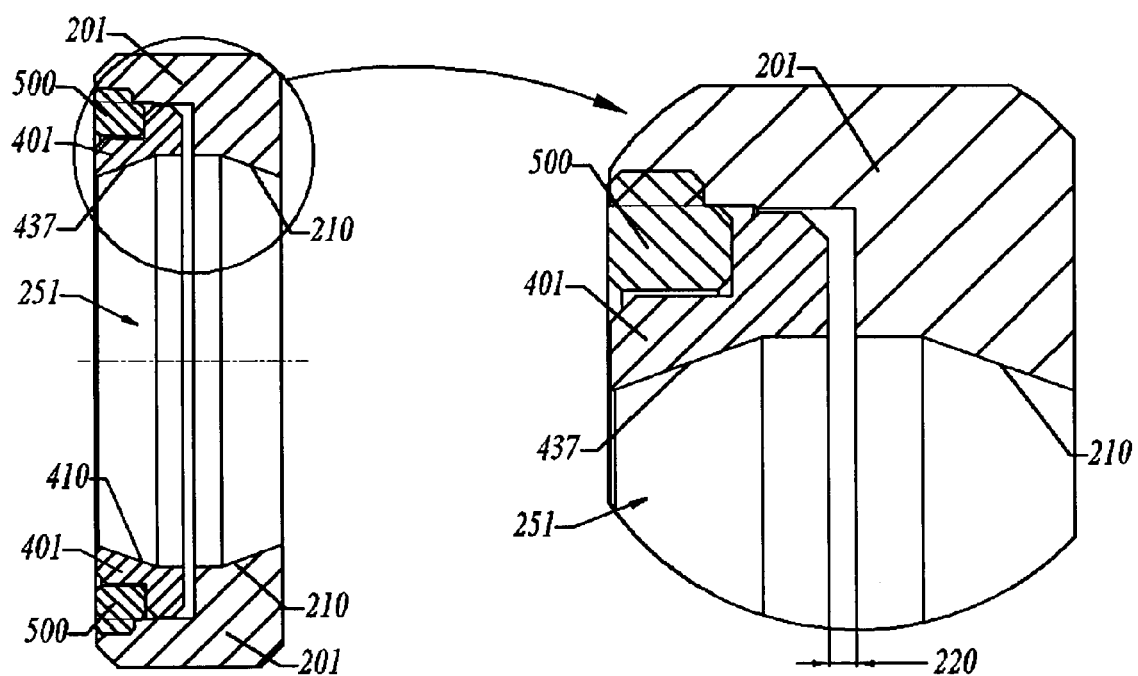
FIG. 10 is a section view of a space adjustable combined internal-conical shaped cavity.

The FIG. 10 shows a space adjustable combined conical cavity 251. Spacing facing co-axis alignment the base 236 of conical hole 210 of stationary plate 201 and the base 426 of conical hole 410 of movable plate 401 with one to another forms this space adjustable combined internal-conical cavity 251. To keep the alignment, the external non-circle ring guiding mechanism 452 of movable plate 401 mates and fits in the non-circle guiding mechanism 252 of stationary plate 201 forms another piston mechanism 120. The movable plate 401 can straightly move forward and draw back along the non-circle guiding mechanism 252 without any rotation.

Figure 8:
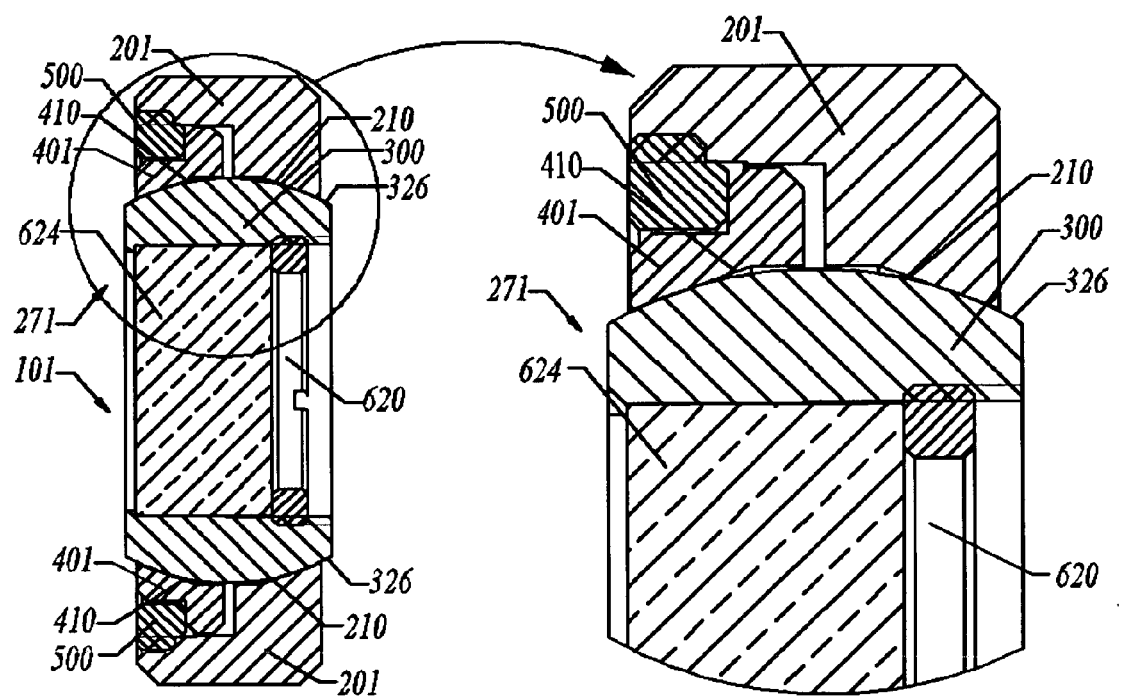
FIG. 8 is a section view of the Adjustable/non-adjustable Precision Optical Mounts according to a second embodiment of this invention.

FIG. 8 shows that the external-spherical round shaped optical element carrier plate 300 mates with and fits in the space adjustable combined internal-conical cavity 251 to form another kind of ball joint mechanism 271. The external-spherical round shaped optical element carrier plate 300 can be tilted for angle adjustment around the center 350 (FIG. 11) of the external-spherical round shaped optical element carrier plate 300 and the optical element 624 that is carried thereby being tilted for angle adjustment. Around the axis 352 (FIG. 11) of external-spherical round shaped optical element carrier plate 300, the external-spherical round shaped optical element carrier plate 300 can be rotated and the optical element 624 that is carried thereby is rotated for adjustment.

The Adjustable/Non-adjustable Precision Optical Mounts 102 according to a third embodiment of the present invention is disclosed while referring concurrently to FIGS. 6-7 and 12-13 of the drawings. The optical mount 102 has a stationary plate 200, a movable plate 400, an external-round column circumference and chamfered edges optical element carrier plate 301 (best shown in FIG. 13) and a locking ring 500.

Figure 12:
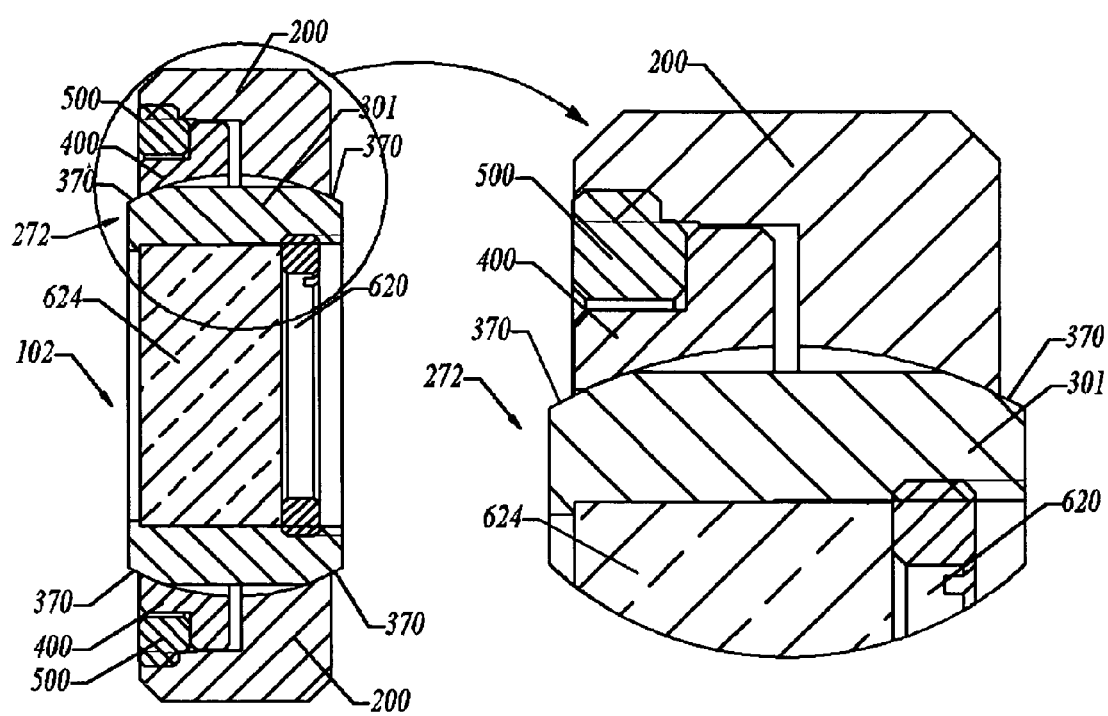
FIG. 12 is section view of the Adjustable/non-adjustable Precision Optical Mounts according to a third embodiment of this invention.
Figure 13:
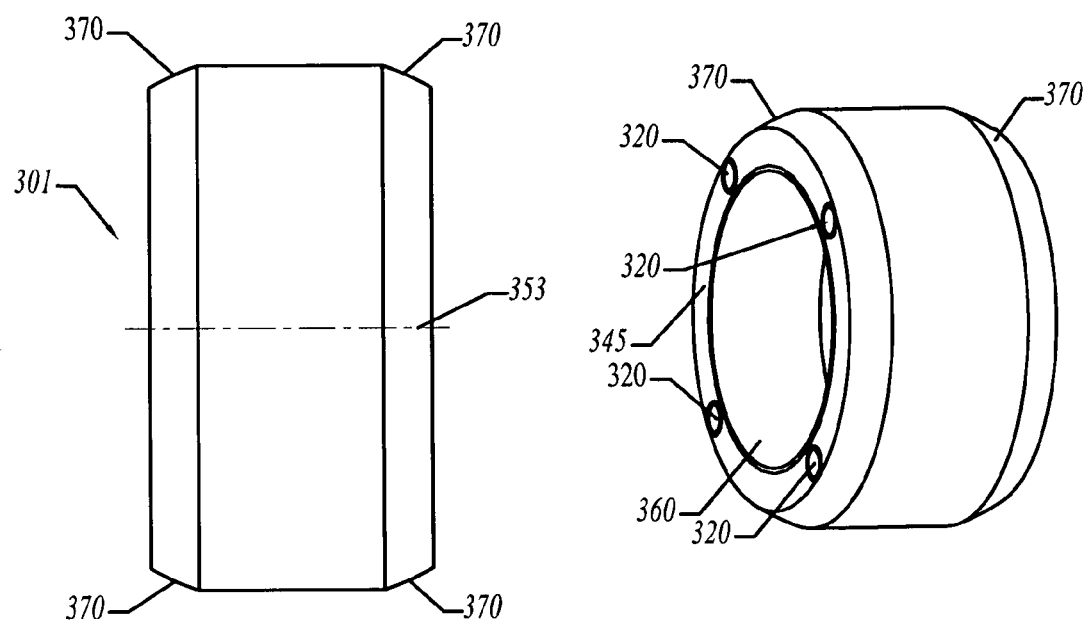
FIG. 13 is a perspective view of an optical element carrier plate with an external-round column circumference and chamfered edges.

FIG. 12 shows that the external-round column circumference and chamfered edges optical element carrier plate 301 mates and fits in the space adjustable combined internal-spherical cavity 250 (FIG. 7) to form a tiltable feature for angle adjustment around axis rotatable joint pair mechanism 272. The external-round column circumference and chamfered edges optical element carrier plate 301 can be tilted for angle adjustment around the center of the space adjustable combined internal-spherical cavity 250 and the optical element 624 that is carried thereby is tilted for angle adjustment. Around the axis 353 of external-round column circumference and chamfered edges optical element carrier plate 301, the external-round column circumference and chamfered edges optical element carrier plate 301 can be rotated and the optical element 624 that is carried thereby is rotated therefore.

Figure 14:
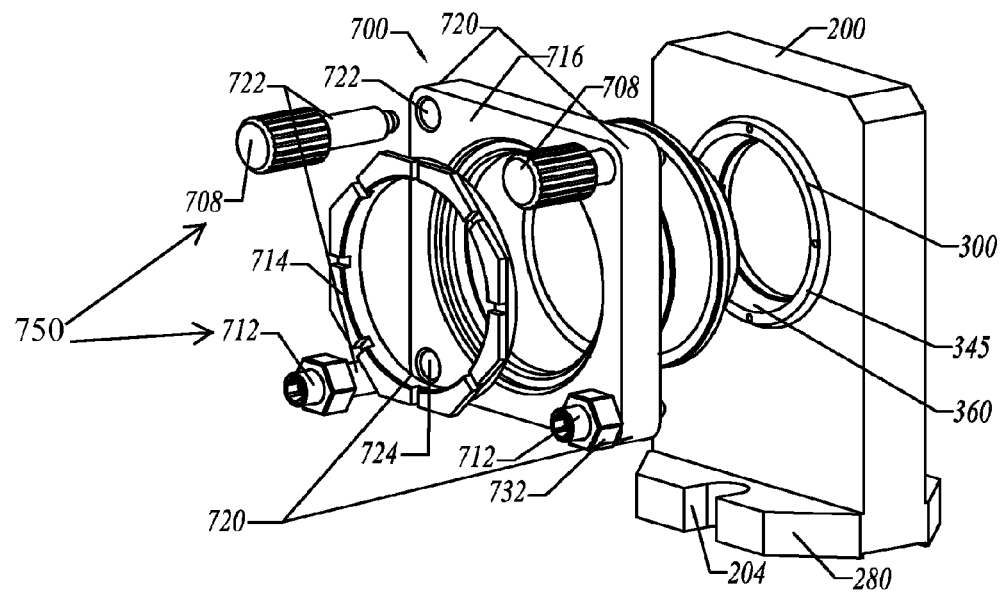
FIGS. 14 & 15 shows an example of the tilting optical element carrier approach.
Figure 15:
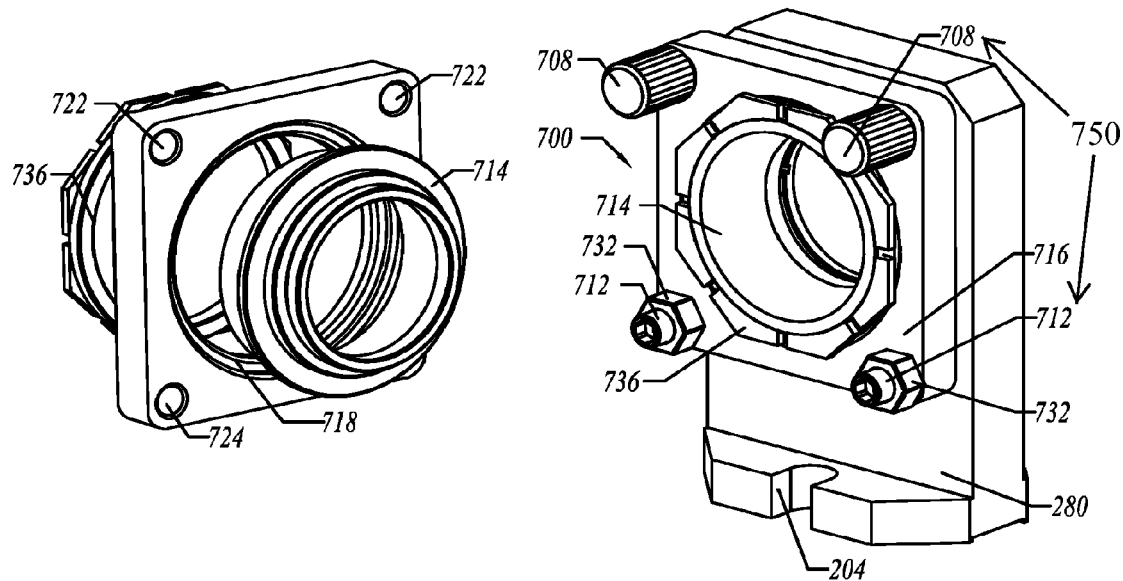
Figure 16:
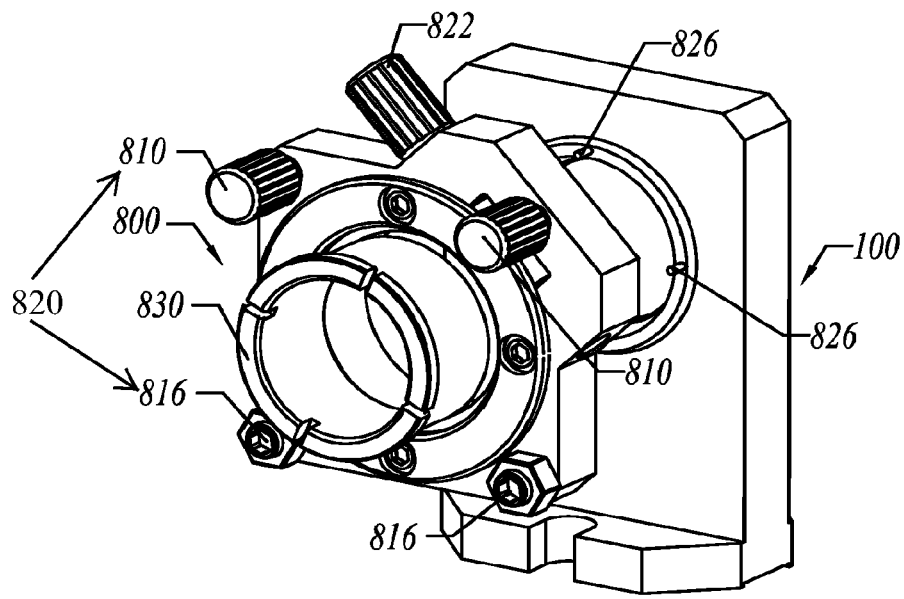
FIGS. 16 & 17 shows an example of the rotating and/or tilting optical element carrier approach.

FIGS. 14 and 15 shows an example of the angle adjustment approach. A removable angle adjustment tool implement 700 includes tilting plate 716, binding plug 714, and actuators 750 which constitute with super fine screw sets 708 for adjustment and spring plungers 712 for keeping position. The tilting plate 716 is put on the back-end surface 345 of the external-spherical round shaped optical element carrier plate 300. Binding plug 714 through the hole 718 on the tilting plate 716 plugs into the interface 360 of the external-spherical round shaped optical element carrier plate 300 and binds the tilting plate 716 tightly onto the external-spherical round shaped optical element carrier plate 300. The actuators 750 are installed to the relative thread holes 722 & 724 on four corners 720 of the tilting plate 716. By adjusting the super fine adjustment screw sets 708 to import the angle adjustment movement, tilting plate 716 can be tilted adjustment and therefore the angle adjustment movement is transferred to the external-spherical round shaped optical element carrier plate 300. The optical element 624 that is carried thereby is angle adjusted for optical energy beam alignment. When completing the angle adjustment alignment, one uses a torque wrench to turn the locking ring 500 to push the movable plate 400 to adjust the space adjustable combined internal-spherical cavity 250 to lock the external-spherical round shaped optical element carrier plate 300, so that the optical element 624 that is carried thereby is firmly locked and fixed. Disassemble the binding plug 714 and remove the removable angle adjustment tool implement 700.

Figure 17:
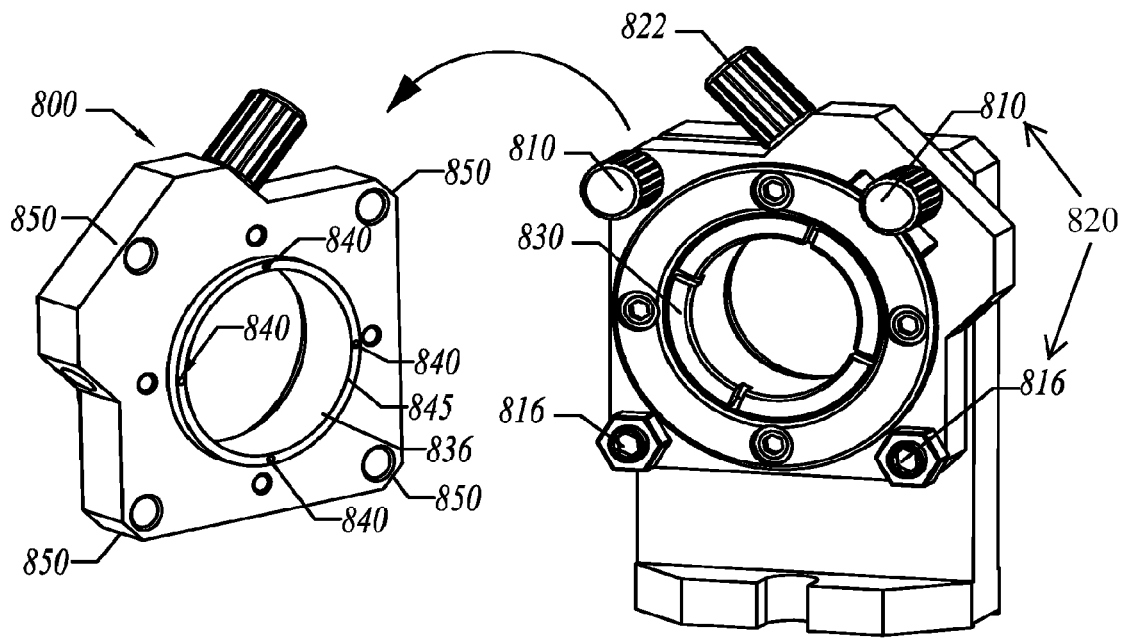

FIGS. 16 and 17 shows an example of the rotating and angle adjustment approach. To rotate and tilt the external-spherical round shaped optical element carrier plate 300 around (FIG. 2) around the optical path axis 351, one must rotate and tilt the optical element 624 (such as wave-plate, nonlinear crystal, prism, etc.) for adjustment; and for that a removable rotating-tilting tool implement 800 that constitutes a worm driven continuous rotation mechanism is necessary. The removable rotating-tilting implement 800 is being bond to the optical mount 100 with a binding plug 830. The rotation movement output port 836 of the removable rotating-tilting implement 800 contacts the back-end surface 345 (FIG. 11) of the external-spherical round shaped optical element carrier plate 300, the mating pins 826 insert into both mating holes 330 on the back-end surface 345 of the external-spherical round shaped optical element carrier plate 300 and the mating holes 840 on the output port surface 845 of the removable rotating-tilting movement implement 800. Super fine adjustment screw sets 810 and spring plungers 816 constitutes actuators 820. One installs the actuators 820 into the relative holes on the corners 850 of the removable rotating-titling movement implement 800. It is shown in FIG. 16 rotation input knob 822 joins with the worm shaft of the removable rotating-tilting movement implement 800. So when rotating the rotation input knob 822, the external-spherical round shaped optical element carrier plate 300 will be rotated for adjustment. One adjusts the fine screw knob 810, of the actuators 820 of the removable rotating-titling movement implement 800 which can be tilted and therefore the optical element 624 that is carried thereby is tilted. When completing the rotating and tilting alignment, a torque wrench is used to turn the locking ring 500, to push the movable plate 400, to adjust the space adjustable combined internal-spherical cavity 250, to lock the external-spherical round shaped optical element carrier plate 300. Therefore the optical element 624 that is carried thereby is firmly locked and fixed. One disassemble the binding plug 830 and removes the removable rotation-tilting movement implement 800.

While the invention has illustrated and described in detail in the drawings and foregoing description, the same is to be considered as illustrative and not restrictive in character it being understood that only the preferred embodiment have been shown and described and that all changes and modifications that come within the spirit of the invention are desired to be protected. The articles "a", "an", "said" and "the" are not limited to a singular element, and include one or more element.

Having thus set forth the embodiments, what is claimed is:

1. An optical mount for supporting and positioning an optical element relative to a beam of optical energy, the optical mount comprising:
   a stationary plate including a stationary plate hole having a first portion;
   a movable plate including a movable plate hole, the movable plate being selectively secured to the stationary plate; and
   an optical element carrier plate that carries the optical element, wherein the optical element carrier plate is sized and shaped to be received and selectively retained between the stationary plate and the movable plate and within the first portion of the stationary plate hole and the movable plate hole, and wherein the optical element carrier plate is selectively rotatable and tiltable relative to the stationary plate and the movable plate.

2. The optical mount of claim 1 wherein the first portion of the stationary plate hole includes a first side and a second side that is smaller than the first side, wherein the movable plate hole includes a first side and a second side that is smaller than the first side, and wherein the first side of the first portion of the stationary plate hole faces the first side of the movable plate hole.

3. The optical mount of claim 2 wherein the first portion of the stationary plate hole is generally curved between the first side and the second side, and wherein the movable plate hole is generally curved between the first side and the second side.

4. The optical mount of claim 3 wherein the optical element carrier plate includes a first edge that faces the first portion of the stationary plate hole and an opposed second edge that faces the movable plate hole, and wherein the optical element carrier plate is generally curved between the first edge and the second edge.

5. The optical mount of claim 2 wherein the first portion of the stationary plate hole includes a straight section that cantilevers away from the first side of the first portion of the stationary plate hole and an angled section that extends between the straight section and the second side of the first portion of the stationary plate hole.

6. The optical mount of claim 5 wherein the optical element carrier plate includes a first edge that faces the first portion of the stationary plate hole and an opposed second edge that faces the movable plate hole, and wherein the optical element carrier plate includes a first angled section that extends at an angle away from the first edge, a second angled section that extends at an angle away from the second edge, and a straight section that extends between the first angled section and the second angled section.

7. The optical mount of claim 1 wherein the stationary plate hole includes a second portion that has a cross-section that is greater than a cross-section of the first portion of the stationary plate hole, and wherein the second portion is adapted to receive the movable plate.

8. The optical mount of claim 1 wherein the movable plate is inhibited from rotating relative to the stationary plate when the movable plate is secured to the stationary plate.

9. The optical mount of claim 1 further comprising a locking ring that selectively secures the movable plate to the stationary plate so that the optical element carrier plate can be selectively secured between the stationary plate and the movable plate.

10. The optical mount of claim 9 wherein the stationary plate hole includes a third portion, wherein a cross-section of the third portion of the stationary plate hole is greater than a cross-section of the first portion of the stationary plate hole, and wherein the third portion is adapted to receive the locking ring.

11. The optical mount of claim 10 wherein the cross-section of the third portion of the stationary plate hole is greater than a cross-section of the second portion of the stationary plate hole, and wherein the cross-section of the second portion of the stationary plate hole is greater than the cross-section of the first portion of the stationary plate hole.

12. The optical mount of claim 1 further comprising an adjustment mechanism including an adjustment plate and a first adjustment screw, the adjustment plate being secured to the optical element carrier plate, the adjustment plate including a first adjuster aperture wherein the first adjustment screw threadedly engages the first adjuster aperture, the first adjustment screw including a distal end that extends fully through the first adjuster aperture and contacts a surface of the stationary plate, wherein the first adjustment screw can be rotated to selectively adjust the tilt of the optical element carrier plate relative to the stationary plate.

13. The optical mount of claim 12 wherein the adjustment mechanism further includes a second adjustment screw, the adjustment plate including a second adjuster aperture wherein the second adjustment screw threadedly engages the second adjuster aperture, the second adjustment screw including a distal end that extends fully through the second adjuster aperture and contacts a surface of the optical element carrier plate, wherein the second adjustment screw can be rotated to selectively adjust the rotation of the optical element carrier plate relative to the stationary plate.

14. An optical mount for supporting and positioning an optical element relative to a beam of optical energy, the optical mount comprising:
a stationary plate;
an optical element carrier plate that carries the optical element; and
an adjustment mechanism including an adjustment plate, a first actuator and a second actuator, the adjustment plate being secured to the optical element carrier plate so that the optical element carrier plate is positioned substantially between the stationary plate and the adjustment plate, the first actuator and the second actuator being selectively secured to the adjustment plate, the first actuator including a distal end that contacts a surface of the stationary plate, wherein the first actuator can be actuated to selectively adjust the tilt of the optical element carrier plate relative to the stationary plate, and the second actuator including a distal end that contacts a surface of the optical element carrier plate, wherein the second actuator can be actuated to selectively adjust the rotation of the optical element carrier plate relative to the stationary plate.

15. The optical mount of claim 14 wherein the first actuator includes a first adjustment screw and the second actuator includes a second adjustment screw, the adjustment plate including a first adjuster aperture and a second adjuster aperture wherein the first adjustment screw threadedly engages the first adjuster aperture and wherein the second adjustment screw threadedly engages the second adjuster aperture, the first adjustment screw including a distal end that extends fully through the first adjuster aperture and contacts a surface of the stationary plate, wherein the first adjustment screw can be rotated to selectively adjust the tilt of the optical element carrier plate relative to the stationary plate, and the second adjustment screw including a distal end that extends fully through the second adjuster aperture and contacts a surface of the optical element carrier plate, wherein the second adjustment screw can be rotated to selectively adjust the rotation of the optical element carrier plate relative to the stationary plate.

16. The optical mount of claim 14 wherein the adjustment mechanism further includes a binding plug that threadedly secures the adjustment plate to the optical element carrier plate.

17. The optical mount of claim 14 further comprising a movable plate that is selectively secured to the stationary plate, the stationary plate including a stationary plate hole having a first portion and the movable plate including a movable plate hole, wherein the optical element carrier plate is sized and shaped to be received and selectively retained between the stationary plate and the movable plate and within the first portion of the stationary plate hole and the movable plate hole.

18. The optical mount of claim 17 wherein the first portion of the stationary plate hole includes a first side and a second side that is smaller than the first side, wherein the movable plate hole includes a first side and a second side that is smaller than the first side, and wherein the first side of the first portion of the stationary plate hole faces the first side of the movable plate hole.

19. The optical mount of claim 17 wherein the stationary plate hole includes a second portion that has a cross-section that is greater than a cross-section of the first portion of the stationary plate hole, and wherein the second portion is adapted to receive the movable plate.

20. The optical mount of claim 17 wherein the movable plate is inhibited from rotating relative to the stationary plate when the movable plate is secured to the stationary plate.

21. The optical mount of claim 17 further comprising a locking ring that selectively secures the movable plate to the stationary plate so that the optical element carrier plate can be selectively secured between the stationary plate and the movable plate.

* * * * *